United States Patent [19]

Pearce et al.

[11] Patent Number: 5,795,940
[45] Date of Patent: Aug. 18, 1998

[54] PIGMENTARY MATERIAL

[75] Inventors: Roy W. J. Pearce, Newcastle; Nigel B. Smith, Stoke on Trent, both of United Kingdom

[73] Assignee: Cookson Matthey Ceramics PLC, London, United Kingdom

[21] Appl. No.: 717,890

[22] Filed: Sep. 23, 1996

[30] Foreign Application Priority Data

Dec. 1, 1995 [GB] United Kingdom ............ 9524588

[51] Int. Cl.⁶ ................................................. C08L 33/04
[52] U.S. Cl. ................................. 525/222; 524/316
[58] Field of Search ............................ 525/222; 524/316

[56] References Cited

U.S. PATENT DOCUMENTS 5,176,751  1/1993  Findley .
5,244,942  9/1993  Hover et al. ................. 524/447

FOREIGN PATENT DOCUMENTS

| | | |
|---|---|---|
| 1146293 | 5/1983 | Canada . |
| 0370424 | 5/1990 | European Pat. Off. . |
| 49-122565 | 11/1974 | Japan . |
| 50-115254 | 9/1975 | Japan . |
| 60-042461 | 3/1985 | Japan . |
| 62-085908 | 4/1987 | Japan . |
| 1490910 | 11/1977 | United Kingdom . |
| 1510560 | 5/1978 | United Kingdom . |

OTHER PUBLICATIONS

WPI Abstract 87–147605.
WPI Abstract 75–84009w.
WPI Abstract 75–38370w.
WPI Abstract 85–095399.
WPI Abstract 84–045622/08.
WPI Abstract 80–85275C/48.
WPI Abstract 75–7313W/44.
WPI Abstract 81–46552D.

*Primary Examiner*—Jeffrey T. Smith
*Attorney, Agent, or Firm*—Stevens, Davis, Miller & Mosher, L.L.P.

[57] ABSTRACT

Colour concentrate pellets for pigmenting polyvinyl chloride are substantially all of diameter 0.1 to 3 mm and comprise pigment dispersed in a carrier comprising ethylene-vinyl acetate polymer which is ethylene-vinyl acetate copolymer and/or alloy thereof with polyethylene, the polymer having a vinyl acetate content of 13–28% by weight and a melt flow index (as measured by the method of ASTM D1238 using a 2.16 kg weight at 190° C.) of 3.5–150 g/10 minutes, the pellets comprising at least 30% by weight of the pigment and at least 10% by weight of the polymer.

26 Claims, No Drawings

PIGMENTARY MATERIAL

This invention relates to colour concentrate pellets for pigmenting polyvinyl chloride, a process for preparing the pellets, their use, and polyvinyl chloride pigmented thereby.

PVC (polyvinyl chloride usually containing additives) is a very widely used plastic. To give it a colour, it is usually pigmented. One type of colour concentrate used to pigment it is a dry powder blend, but such powders cause environmental concerns over dust levels and also have problems of the mess they cause and of cleaning apparatus which has contained them. In another type of colour concentrate, pellets comprise pigment and carrier. The pigment colours the PVC, and the carrier acts as a binder and also to facilitate the dispersion of the pigment in the PVC. In one type of colour concentrate pellet, the pigment is dispersed in the carrier. In this type, the carrier may be polyvinyl chloride itself, but for easier dispersion in the PVC, is conventionally a wax. The pellets in which the carrier is a wax, though, have various disadvantages. The wax tends to migrate through the PVC during processing to pigment it, and this can cause problems at its surface, for instance in terms of its gloss or the adhesion of a layer (eg of aluminium-backed wood grain) to be laminated to the surface. In addition, the wax dispersions have a significant detrimental effect on the physical properties of the PVC, such as its impact strength or tensile strength. The pellets also tend to abrade during transport and in the feed equipment for introducing them into PVC, resulting in a dusty product and a coating left on the surface of the feed equipment (though they are cleaner in use than the dry powders). A dusty product is environmentally undesirable and the dustiness creates difficulty in metering accurately the required amount to pigment the PVC to the desired extent and consequently in the uniformity of mixing with the PVC. The coating, particularly of waxy material, left on the surface of the feed equipment makes for difficulty in cleaning, causing equipment "downtime" due to the need to clean; the coating also risks contaminating any different pigmentary material subsequently used in the feed equipment. Furthermore, it would be desirable for the pellets to be of narrow size distribution, for ease of metering and for ease of mixing with the PVC, but the commercial wax-containing pellets are not of narrow size distribution, because of their process of preparation and the difficulty of comminuting them caused by the wax. It would be desirable to have a higher content of pigment in the pellets, so that a smaller amount of pellets needs be transported, stored and used for a given amount of pigment, though then the ready usage in equipment, for instance resistance to abrasion and being easily meterable, becomes more important. The present invention provides improved colour concentrate pellets for pigmenting PVC.

Accordingly, the invention provides colour concentrate pellets for pigmenting polyvinyl chloride, which pellets are substantially all of diameter 0.1–3 mm and which pellets comprise pigment dispersed in a carrier comprising ethylene-vinyl acetate polymer which is ethylene-vinyl acetate copolymer and/or alloy thereof with polyethylene, the polymer having a vinyl acetate content of 13–28% by weight and a melt flow index (as measured by the method of ASTM D 1238 using a 2.16 kg weight at 190° C.) of 3.5–150 g/10 minutes, the pellets comprising at least 30% by weight of the pigment and at least 10% by weight of the polymer.

The invention provides also a process for preparing the pellets, which process comprises solidifying a dispersion of the pigment in the carrier in the molten state.

The invention also provides a method for pigmenting polyvinyl chloride by solidifying a molten mixture of the polyvinyl chloride and the pellets in which the polyvinyl chloride and the ethylene-vinyl acetate polymer are both in the molten state.

The invention provides also polyvinyl chloride pigmented by having been co-melted with the pellets.

Many polymeric carriers of pigments are known, but it has been discovered that the present pellets are highly advantageous and represent an improvement over the pellets commercially available for pigmenting polyvinyl chloride. The present polymer, as is apparent from its melt flow index, is not waxy. In contrast to a wax, it does not migrate readily through the PVC. It has little detrimental effect on the properties of the PVC, and can even enhance those such as impact strength. It can readily be processed into the PVC to pigment it. The pellets are resistant to abrasion, and are dust-free, free flowing and easily meterable. They can readily be obtained in even shape, particularly as solid cylinders or spheres, and in their narrow size distribution. The pigment is dispersed in the carrier, not just on its surface; accordingly, for a given amount of pigment, a lower amount of carrier, which could influence properties, is incorporated into the PVC. The pigment disperses readily within the PVC, using lower amounts of added material. The ready dispersion enables an even colouration, without the presence of streaks, to be obtained. The present pellets have softening points below those of the commercial colour concentrate pellets in which the carrier is polyvinyl chloride itself (for instance 60°–70° C. as against 180° C.). The lower softening point leads to improved dispersion within the PVC to be pigmented.

The present ethylene-vinyl acetate polymer is not waxy. This contrasts with the reference in U.S. Pat. No. 5,176,751 to a carrier which is a mixture of a stearamide wax and a low molecular weight, waxy ethylene-vinyl acetate copolymer. The pellets of this reference are friable; it is very much preferred that the present pellets be not friable, so that they are more abrasion resistant and do not become dusty, eg during use or transport. Ethylene-vinyl acetate copolymer, like many polymers, has long been known as a blend with PVC—see for instance Japanese specification 56050944—but the present ethylene-vinyl acetate polymer has not been known in the present pellets. U.S. Pat. No. 5,244,942 discloses homogeneous synthetic resin sheet or panel, of a multi-colour structure, containing ethylene-vinyl acetate copolymer and at least one of polyethylene and polypropylene, and optionally a copolymer of ethylene and propylene as a polymeric binder and having contents of fillers and optionally auxiliary agents, characterised in that the vinyl acetate proportion in the total batch of the synthetic resin sheet or panel is 3–14% by weight, the proportion of the fillers including the auxiliary agents is 35–80% by weight of the total batch and the content of the copolymer of ethylene and propylene is less than 5% by weight, based on the proportion of the binder. The reference refers to up to 5% by weight of a colour component. There is no mention of colour concentrate pellets.

The present ethylene-vinyl acetate polymer is an ethylene-vinyl acetate copolymer (EVA) and/or alloy thereof with polyethylene. The term "alloy" refers to a co-melted mixture of EVA with polyethylene. It can be seen that the content of any polyethylene in the mixture affects the vinyl acetate content of the ethylene-vinyl acetate polymer. For instance an alloy of 50% EVA having a vinyl acetate content of 18% with 50% polyethylene has a vinyl acetate content of 9%. Percentages and parts in this specification are by weight unless otherwise indicated.

The melt flow index of the ethylene-vinyl acetate polymer is 3.5–150 g/10 minutes, preferably 3–25 g/10 minutes, for instance 8 g/10 minutes. The number average molecular weight of the polymer is usually at least 10000 and preferably is 10000–40000, especially 15000–30000. The polymer has a Vicat softening point preferably of 40°–65° C., for instance 61° C.

The vinyl acetate content of the ethylene-vinyl acetate polymer is 13–28%, particularly 18%. It has been discovered surprisingly that in the graph of gel time against vinyl acetate content, a dip occurs, so that the gel time of the polymers with contents from 13–28% is lower than that on either side of the range, reaching a minimum at a content of about 18%. This minimum corresponds to a gel time slightly above that of PVC. Gel time is the time taken between maximum torque in the dry state and the maximum torque at the gel point. It is desirable that the gel time of PVC plus pellets be similar to that of the PVC alone, so that for pigmenting PVC a molten mixture of the PVC and pellets can more readily be formed. In the case of PVC plus pellets whose gel times are much higher than that of the PVC, one would need to suffer worse processing conditions, for instance a longer extruder in which the molten mixture is formed to allow for the higher gel time, or a lower throughput. Thus, the present pellets pigment PVC surprisingly easily.

It is an advantage of the present pellets that they can contain high amounts of pigment. The pellets usually contain 30–90%, generally 50–90%, preferably 60–90%, especially 70–85% of pigment. The pigment can be organic or inorganic. It can be a mixture of individual pigments. It can be a pigment conventionally used to colour PVC. It can contain conventional additives such as fillers, processing aids and performance enhancers such as UV absorbers, antioxidants, light stabilisers and optical brighteners. The pigment usually comprises 30–100% of pigmentary material itself. For production of the pellets in the preferred way, the pigment should be thermally stable at temperatures above 140° C. The pigment can be for instance titanium dioxide, lead chromate, lead molybdate, calcium carbonate, phthalocyanine blue or green, or carbon black, or a mixture of two or more of these.

The pellets contain enough carrier to carry the pigment. The carrier usually consists essentially of the ethylene-vinyl acetate polymer, though mixtures with other carrier materials can be employed. Preferably, the ethylene-vinyl acetate polymer is ethylene-vinyl acetate copolymer rather than alloy thereof with polyethylene or a mixture of the copolymer and alloy. The pellets usually contain 10–50% of the polymer.

The pellets can contain additives, eg stabilisers such as antioxidants or UV absorbers. Especially, however, the pellets can contain lubricant, particularly when the higher amounts (for instance 50–90%) of pigment are present. The lubricant aids the production and the use of the pellets. It reduces pigment abrasion and equipment wear during processing to prepare the pellets (and hence reduces the shear heat to protect the pigment and polymer from carbonization) and aids in use dispersing the pigment into the PVC. The lubricant can be a metal salt of a long chain carboxylic acid, preferably stearic acid. Calcium stearate is preferred because of its compatibility with PVC and also because of its melting point (150° C.). The weight ratio of the pigment to the lubricant is usually from 5:1 to 19:1, for instance 9:1.

The weight ratio of pigment plus additive (eg comprising lubricant) to the ethylene-vinyl acetate polymer is usually from 1:9 to 9:1, preferably from 3:2 to 4:1, for instance 7:3.

The pellets can contain filler, but this is not preferred. They preferably are free from wax. They preferably are free from polyvinyl chloride.

Advantageously the pellets are of a similar size to pellets of resin with which they are to be admixed in order to pigment the resin. Substantially all of the pellets are of diameter 0.1–3 mm, especially 0.1–1.5 mm, particularly 0.5–1.5 mm. The smaller pellets distribute better within the resin.

For ease of use, the pellets are preferably evenly shaped rather than irregularly shaped. Preferably, substantially all of the pellets are so evenly shaped that their dimension in any one direction is no more than 200%, especially 100%, more than that in any other direction. The pellets are preferably solid cylindrical (preferably with a length to diameter ratio from 0.5:1 to 2:1) or especially solid spherical.

The pellets are preferably prepared by solidifying a dispersion of the pigment in the carrier in the molten state. The dispersion is advantageously solidified by extrusion of the dispersion. It is particularly advantageous that the extrusion be into water; this contrasts with the conventional wax-containing pellets, which are prepared by a more complex process—the wax would emulsify in the water. Preferably, the material extruded into water is cut into the pellets in the water.

The dispersion of the pigment in molten carrier is preferably formed by feeding pigment and carrier to an extruder or other high shear mixer, eg a Banbury mixer, which melts the carrier and compounds the pigment into it.

The pigment is preferably pre-blended with any lubricant to produce a homogeneous blend. Some or all of the carrier can likewise be admixed; the carrier is usually provided in pellet or powder form. The blending can be carried out in a mixer, eg a tumble mixer or a rotary mixer.

The extruder or other high shear mixer can be operated batch-wise, but preferably is operated continuously. It includes a heated, high shear, mixing section. The extruder can have one or more feed ports. Where there are two or more feed ports, carrier can be introduced through one, and pigment—for instance the pigment blend discussed above—through one or more of the others. When there is only one feed port, all the components are fed through it. The carrier is usually introduced in pellet or powder form. The extruder should have at least one ventilation port, preferably fitted with a vacuum system, to remove any volatile materials generated during the process. The mixer operates preferably at 80°–230° C., preferably 100°–180° C., especially at 130°–150° C.

The dispersion of the pigment in molten carrier is usually passed, preferably via an in-line aggregate separation device, to a heated die, through which the molten dispersion is extruded, advantageously into water, and thereby solidified.

The extruded material can be cut to length by a cutter. The cutter preferably operates under water to produce the present pellets in water. The pellets can be separated from the water by conventional means. The water can be maintained at an appropriate temperature in a closed loop system using heat exchangers. The water can perform three main functions:

(a) collecting and separating the pellets after cutting to avoid re-agglomeration;

(b) allowing the pellets to spheronise, if desired; and (c) transporting the pellets to a dryer.

The present pellets are useful particularly for pigmenting PVC. This can be done in conventional ways. It can be done by solidifying a molten mixture of the PVC and pellets. The ethylene-vinyl acetate polymer and the polyvinyl chloride melt and mix with one another and form the molten mixture. The PVC and pellets can be admixed while both are in solid form, and the mixture then heated to form the molten mixture. Alternatively, the pellets can be introduced into molten PVC. Preferably the molten mixture is formed and solidified by an extruder. For instance, the pellets and solid PVC can be pre-blended and the blend then passed into the extruder, or the pellets and solid PVC can be admixed at the inlet to the extruder.

Polyvinyl chloride itself tends to be an unstable polymer at its normal processing temperature. It is generally employed commercially, therefore, and can be so employed in the present invention, in the form of a composition containing additives. The additives can be for instance stabilisers, processing aids, lubricants and fillers. The PVC composition usually contains 90–95% polyvinyl chloride. It is an advantage of the present pellets that they have little effect on the processing parameters of the PVC and can enhance physical properties of the end product.

The pellets are usually used at a loading of 0.17–15.0, preferably 0.5–5, parts of the pellets per 100 parts of the PVC composition.

The pigmented PVC is usually extruded or injection moulded to form desired articles. The PVC is preferably rigid PVC.

It can be seen that the invention provides PVC pigmented by having been co-melted with the present pellets. In a particular embodiment, the pigmented PVC bears a layer laminated to its surface; this embodiment realises the advantage of the present ethylene-vinyl acetate polymer not migrating through the PVC, as wax tends to, to impair the adhesion of the layer to its PVC substrate.

The invention is illustrated by the following Examples.

EXAMPLE 1

630 kg of dark brown pigment was blended with 70 kg of calcium stearate in a high speed Henschel disperser. The pigment was iron chrome brown (Colour Index Pigment Brown 29).

The hopper of a gravimetric polymer feeder was charged with 300 kg of EVA pellets of 18% vinyl acetate content and melt flow 8. The polymer feed was connected to the number one port of a thermoplastic extruder maintained at a temperature of 150° C.

The brown pigment blend was loaded into a second gravimetric feeder, which discharged into a twin screw side feeder located on the second port of the extruder.

The feed ratio of 30 parts polymer and 70 parts pigment blend was programmed into a feeder controller.

The discharge of the extruder was routed via a screenpack and a polymer diverter valve to an underwater pelletising system. The holes in the die were of 0.5 mm diameter.

The extruder was set running at 300 rpm and the polymer and pigment blend feeders started. Once satisfactory flow was achieved, the polymer diverter valve was closed to force the melt through the die. The cutter was run at 3000 rpm with a water throughput of 20 m$^3$ per hour. The pellet suspension was carried to a centrifugal drier where the water was removed and returned to the circulation system. A counter-current of air aided the drying process. The dry micro-pellets were discharged from the drier into storage containers.

The finished pellets were of near spherical shape with a diameter of 0.5 mm.

EXAMPLE 2

Following the procedure of Example 1 but using a die whose holes were of 1.0 mm diameter, finished pellets of near spherical shape and of diameter 1.0 mm were obtained.

EXAMPLE 3

630 kg of light brown pigment was blended with 70 kg of calcium stearate and 300 kg of EVA powder of vinyl acetate content 18% and melt flow index 8 in a high speed Henschel disperser. The pigment was a mixture of 59% lead molybdate red (Colour Index Pigment Red 104), 40% lead chromate yellow (Colour Index Pigment Yellow 34) and 1% carbon black (Colour Index Pigment Black 7).

The hopper of a volumetric polymer feeder was charged with the blend. The feeder was connected to the number one port of a thermoplastic extruder maintained at a temperature of 150° C.

The discharge of the extruder was routed via a 3 mm diameter hole die. The strand was drawn through a water bath, past an air knife and into a pelletiser which generated 3 mm diameter cylindrical pellets of length 3 mm.

EXAMPLE 4

Following the procedure of Example 3 but drawing the strand under greater tension through the water bath, cylindrical pellets of diameter 2 mm and length 3 mm were obtained.

EXAMPLE 5

15.75 kg of grey pigment was blended with 1.75 kg of calcium stearate and 7.5 kg of EVA pellets of vinyl acetate content 18% and melt flow index 8 in a high speed Henschel disperser. The pigment was a mixture of 97% titanium dioxide (Colour Index Pigment White 6) and 3% carbon black (Colour Index Pigment Black 7).

The hopper of a volumetric feeder was charged with the blend. The feeder was connected to the number one port of a thermoplastic extruder maintained at a temperature of 150° C.

The discharge of the extruder was routed via a 3 mm diameter hole die. The strand was drawn through a water bath, past an air knife and into a pelletiser which generated 3 mm diameter cylindrical pellets of length 3 mm.

EXAMPLE 6

Following the procedure of Example 5 but drawing the strand under greater tension through the water bath, cylindrical pellets of diameter 2 mm and length 3 mm were obtained.

We claim:

1. Colour concentrate pellets for pigmenting polyvinyl chloride, which pellets are substantially all of diameter 0.1–3 mm and which pellets comprise pigment dispersed in a carrier comprising ethylene-vinyl acetate polymer which is ethylene-vinyl acetate copolymer and/or alloy thereof with polyethylene, the polymer having a vinyl acetate content of 13–28% by weight and a melt flow index (as measured by the method of ASTM D1238 using a 2.16 kg weight at 190° C.) of 3.5–150 g/10 minutes, the pellets comprising at least 30% by weight of the pigment and at least 10% by weight of the polymer.

2. Pellets according to claim 1 wherein the polymer has a number average molecular weight of 10000–40000.

3. Pellets according to claim 1 containing 30–90% by weight of the pigment.

4. Pellets according to claim 1 containing 10–50% by weight of the polymer.

5. Pellets according to claim 1 containing lubricant in a weight ratio of the pigment to the lubricant of from 5:1 to 19:1.

6. Pellets according to claim 1 substantially all of which are so evenly shaped that their dimension in any one direction is no more than 100% more than that in any other direction.

7. Pellets according to claim 1 which are free from wax.

8. Pellets according to claim 1 which are free from polyvinyl chloride.

9. A process for preparing pellets claimed in claim 1, which process comprises solidifying a dispersion of the pigment in the carrier in the molten state.

10. A process according to claim 9 wherein the dispersion is solidified by extrusion of the dispersion.

11. A process according to claim 10 wherein the extrusion is into water and the extruded material is cut into the pellets in the water.

12. A method for pigmenting polyvinyl chloride, which method comprises solidifying a molten mixture of the polyvinyl chloride and pellets claimed in claim 1.

13. A method according to claim 12 wherein the pellets are as claimed in claim 2.

14. A method according to claim 12 wherein the pellets are as claimed in claim 3.

15. A method according to claim 12 wherein the pellets are as claimed in claim 4.

16. A method according to claim 12 wherein the pellets are as claimed in claim 5.

17. A method according to claim 12 wherein the pellets are as claimed in claim 6.

18. A method according to claim 12 wherein the pellets are as claimed in claim 7.

19. Polyvinyl chloride pigmented by having been co-melted with pellets claimed in claim 1.

20. Polyvinyl chloride according to claim 19 which bears a layer laminated to its surface.

21. Pellets according to claim 1, consisting essentially of said pigment dispersed in said carrier, said carrier consisting essentially of ethylene-vinyl acetate polymer which is ethylene-vinyl acetate copolymer and/or alloy thereof with polyethylene.

22. Pellets according to claim 21, further consisting essentially of at least one member of the group consisting of filler, lubricant, UV absorber, antioxidant, light stabilizer and optical brightener.

23. Pellets according to claim 1, comprising 60–90% by weight of the pigment.

24. Pellets according to claim 1, wherein the pellets have a diameter of 0.1–3 mm.

25. Pellets according to claim 1, wherein the vinyl acetate content of the polymer is 13–18% by weight.

26. Pellets according to claim 1, containing 50–90% by weight of the pigment.

* * * * *